US008559055B2

(12) United States Patent
Hikosaka

(10) Patent No.: US 8,559,055 B2
(45) Date of Patent: Oct. 15, 2013

(54) IMAGE FORMING APPARATUS

(75) Inventor: Ariyoshi Hikosaka, Chuo-ku (JP)

(73) Assignee: Kyocera Document Solutions Inc., Osaka (JP)

( * ) Notice: Subject to any disclaimer, the term of this patent is extended or adjusted under 35 U.S.C. 154(b) by 1248 days.

(21) Appl. No.: 12/231,600

(22) Filed: Sep. 3, 2008

(65) Prior Publication Data

US 2009/0059258 A1    Mar. 5, 2009

(30) Foreign Application Priority Data

Sep. 4, 2007   (JP) .................... 2007-228721

(51) Int. Cl.
*G06F 15/00*    (2006.01)
*G06K 1/00*    (2006.01)

(52) U.S. Cl.
USPC .......... 358/1.9; 358/1.13; 358/1.15; 358/296; 358/3.27; 358/2.1; 347/5; 347/2.3

(58) Field of Classification Search
USPC .............. 358/1.9, 1.13, 1.15, 296; 347/5, 2, 3
See application file for complete search history.

(56) References Cited

U.S. PATENT DOCUMENTS

| 4,941,057 | A | 7/1990 | Lehmbeck et al. |
| 6,220,687 | B1 * | 4/2001 | Takahashi et al. ............... 347/5 |
| 2005/0117927 | A1 * | 6/2005 | Tanaka et al. .................. 399/49 |
| 2007/0070389 | A1 * | 3/2007 | Hidaka ....................... 358/1.15 |

FOREIGN PATENT DOCUMENTS

| CN | 1871845 A | 11/2006 |
| JP | 11-136528 | 5/1999 |

* cited by examiner

*Primary Examiner* — Steven Kau
*Assistant Examiner* — Quang N Vo
(74) *Attorney, Agent, or Firm* — Jordan and Hamburg LLP

(57) ABSTRACT

Test print images are created as focusing on one image quality mode among a plurality of image quality modes that are provided in advance according to the type of document and with high practical needs such as text mode, photo mode, text/photo mode containing both text and photographs, etc. The test print images thus created are image-formed on a sheet of recording paper and offered for the purpose of image quality selection in accordance with a user's preference. Consequently, an image forming apparatus capable of realizing a test printing function that is practical with a high level of user satisfaction can be provided.

10 Claims, 5 Drawing Sheets

Fig. 4

| Image quality mode (adjusting margin) | Sharpness (3 levels) | Density (5 levels) | Ground color removal (ON/OFF) |
|---|---|---|---|
| Text | ○ | ○ | ○ |
| Text/Photo | ○ | ○ | × |
| Photo | ○ | ○ | × |

Example of test print images when image quality mode is text/photo mode

IMAGE FORMING APPARATUS

TECHNICAL FIELD

The present invention relates to an image forming apparatus having a test print function of image-forming test print images with variations of image quality adjusting elements on a sheet of recording paper, and in particular, to an image forming apparatus capable of realizing a test print function that is practical with a high level of user satisfaction.

BACKGROUND ART

Recent image forming apparatuses are installed with a variety of image quality adjusting functions in order to meet various user's demands for image quality. More specifically, for example, a variety of image quality adjusting functions are offered; an image quality mode adjusting function for adjusting to an image quality mode suitable for the type of document, a sharpness adjusting function for adjusting edge enhancement of an image, an image density adjusting function for adjusting the density of an image, a ground color adjusting function for adjusting the density matched to the ground color of a document, etc.

In the image forming apparatuses of this kind, a large amount of printed materials against a user's intention are produced if there is an inappropriate part in information about image quality adjustment, when a user is intending to make multiple copies of a printed material with combinations of a plurality of image quality adjusting functions. Thus, an image forming apparatus having a test print function of printing only one copy first as a test has been known.

As an example of the image forming apparatus having such a test print function, there has been proposed an art of creating and outputting test print images that show each effect of a selected plurality of image processings by actual examples into a single page, letting a user select a preferred image quality from the output images and controlling the image processings based on the result (see U.S. Pat. No. 4,941,057).

In the foregoing patent literature, however, it is not disclosed or suggested at all that a plurality of images having been performed with image processings related to variations of image quality adjusting elements such as sharpness, image density and the like are laid out into a single page to carry out a test print, as focusing on one image quality mode having been selected from among a plurality of image quality modes provided in advance according to the type of document such as text mode, photo mode, text/photo mode containing both text and photographs, etc.

SUMMARY OF THE INVENTION

It is an object of the present invention to provide an image forming apparatus capable of realizing a test print function that is practical with a high level of user satisfaction by laying out a plurality of images having been performed with image processings related to variations of image quality adjusting elements such as sharpness, image density and the like into a single page, as focusing on one image quality mode having been selected from among a plurality of image quality modes.

In order to achieve the foregoing object, an image forming apparatus according to the present invention includes an operational information accepting section accepting operational information, about selection of one image quality mode in line with a user's intention from among a plurality of image quality modes provided in advance according to the type of document, and about selection of one or more image quality adjusting elements in line with a user's intention from among variations of image quality adjusting elements; a test print image creating section creating test print images in which variation images on each image quality adjusting band of the one or more image quality adjusting elements having been selected in the operational information accepting section are laid out into a single page as focusing on the one image quality mode having been selected in the operational information accepting section; and an image forming section forming the test print images having been created by the test print image creating section on a sheet of recording paper.

Operation and Effects of the Invention

In the image forming apparatus according to the present invention, the operational information accepting section accepts operational information about selection of one image quality mode in line with a user's intention from among a plurality of image quality modes provided in advance according to the type of document. The operational in formation accepting section also accepts operational information about selection of one or more image quality adjusting elements in line with a user's intention from among variations of image quality adjusting elements. In response to that, the test print image creating section focuses on the one image quality mode having been selected in the operational information accepting section, and creates test print images in which variation images on each image quality adjusting band of the one or more image quality adjusting elements having been selected in the operational information accepting section are laid out into a single page. Then, the image forming section image-forms the test print images having been created by the test print image creating section on a sheet of recording paper. By this means, the test print images are created as focusing on each of the image quality modes that are provided in advance according to the type of document and with remarkably high practical needs such as text mode, photo mode, text/photo mode containing both test and photographs. The test print images thus created are image-formed on a sheet of recording paper and offered for the purpose of image quality selection according to a user's preference. Consequently, an image forming apparatus capable of realizing a test print function which is practical with a high level of user satisfaction can be provided.

BRIEF DESCRIPTION OF THE DRAWINGS

FIG. 4 is an explanatory diagram showing a combinational example of a plurality of image quality adjusting elements, each of which is set as focusing on one image quality mode among a plurality of image quality modes.

DETAILED DESCRIPTION OF THE INVENTION

Hereinafter, an image forming apparatus in accordance with an embodiment of the present invention will be described in detail with reference to the drawings.

[General Configuration of a Periphery of an Image Forming Apparatus]

Figure 1:
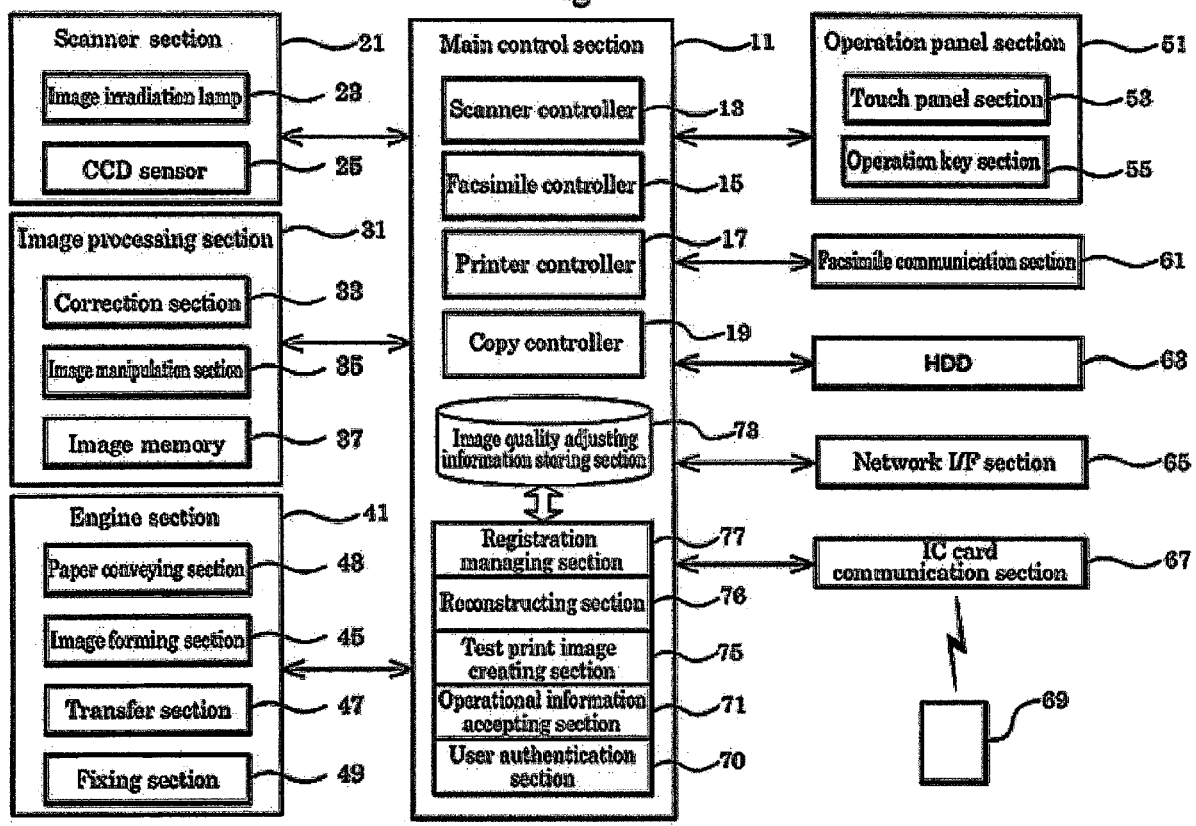
FIG. 1 is a functional block diagram showing a general configuration of an image forming apparatus according to the present invention.

In the image forming apparatus, as shown in FIG. 1, a variety of functions including a copy job, a facsimile transmission job, a print job and a network communication (mail transmission or data transmission) job are available. The apparatus is controlled by a main control section 11 composed of a microcomputer and dedicated hardware circuitry. As input/output devices connected to the main control section 11 and taking charge of various functions, the apparatus includes a scanner section 21, an image processing section 31, an engine section 41, an operation panel section 51, a facsimile communication section 61, a hard disk drive (HDD) 63, a network interface (I/F) section 65 and an integrated circuit (IC) card communication section 67.

The main control section 11 houses a scanner controller 13 controlling an operation for achieving a scanner function, a facsimile controller 15 controlling an operation for achieving a facsimile function, a printer controller 17 controlling an operation for achieving a printer function and a copy controller 19 controlling an operation for achieving a copy function. The main control section 11 has overall control for an operation of the entire apparatus.

The scanner section 21 includes an image irradiation lamp 23 and a charge coupled device (CCD) sensor 25 constituting a scanner (not shown). The image irradiation lamp 23 irradiates a document and the CCD sensor 25 receives its reflected light, whereby the scanner section 21 reads out an image from the document and outputs image data corresponding to the read-out image to the image processing section 31.

The image processing section 31 includes a correction section 33, an image manipulation section 35 and an image memory 37. The image processing section 31 processes the image data having been read by the scanner section 21, with use of the correction section 33 and image manipulation section 35 if necessary, and stores the processed image data on the image memory 37 or outputs the processed image data to the engine section 41 and the facsimile communication section 61. The correction section 33 makes a predetermined correction such as level correction, gamma correction and the like to the image data which has been read by the scanner section 21. The image manipulation section 35 executes a variety of manipulating processings such as compression or expansion and scaling of image data.

The engine section 41 functioning as an image forming section in the present invention serves to image-form test print images having been created by a test print image creating section 75 which will be described later on a sheet of recording paper. Therefore, the engine section 41 includes a paper conveying section 43 composed of a paper feeding cassette, a paper feeding roller, etc., which are not shown, an image forming section 45 composed of a photosensitive drum, an exposure system, a development system, etc., which are not shown, a transfer section 47 composed of a transfer roller, etc., (not shown) and a fixing section 49 composed of a fixing roller, etc., (not shown). The engine section 41 prints out an image on a sheet of recording paper by means of image data which has been read by the scanner section 21, image data which has been transmitted from a client personal computer (PC) by a local area network (LAN) via the network I/F section 65 and image data of facsimile data, etc., which has been received from an external facsimile machine, etc., by the facsimile communication section 61. More specifically, the paper conveying section 43 conveys a sheet of recording paper to the image forming section 45, which forms a toner image corresponding to the foregoing image data. The transfer section 47 transfers the toner image on the sheet of recording paper. The fixing section 49 fixes the toner image on the sheet of recording paper to form an image.

Figure 2:
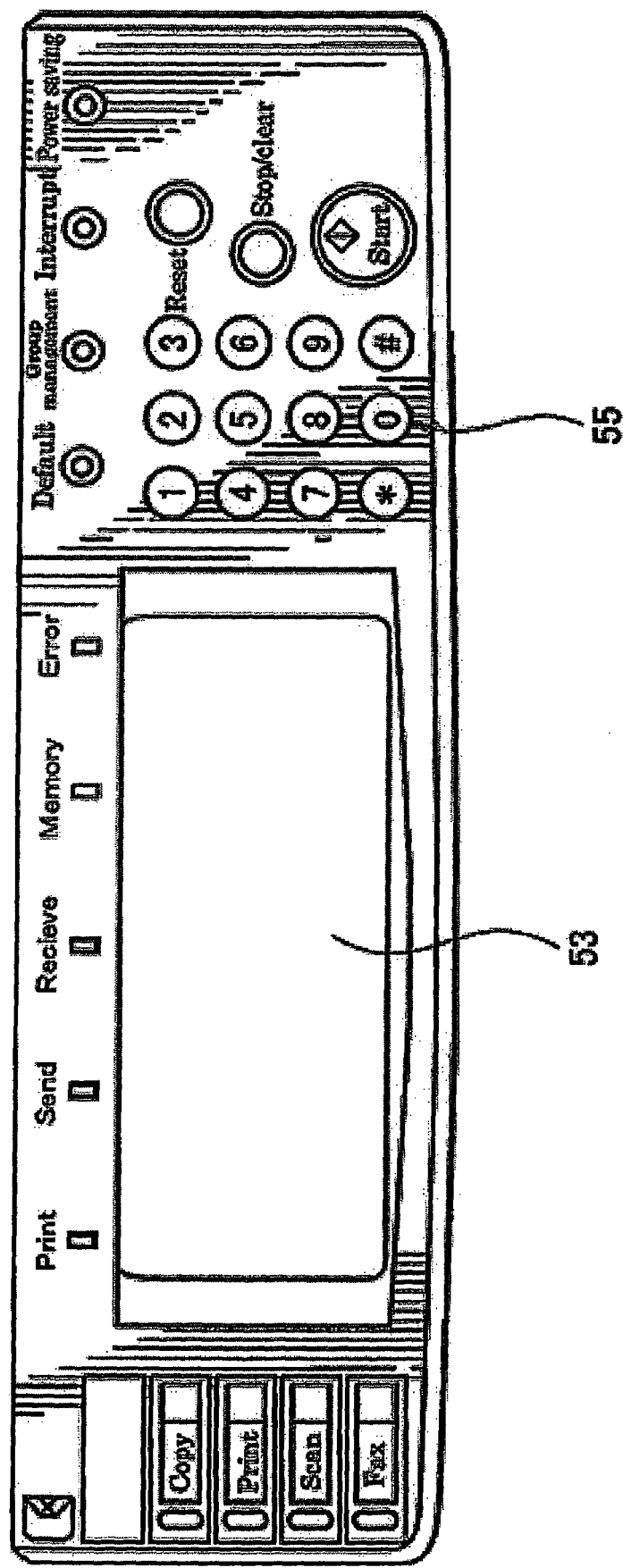
FIG. 2 is an external view of an operation panel section of the image forming apparatus according to the present invention.

The operation panel section 51 includes a touch panel section 53 and an operation key section 55, as shown in FIGS. 1 and 2. The operation panel section 51 is used in order that a user may conduct an operation related to a scanner function, a facsimile function, a printer function or a copy function, etc. The operation panel section 51 provides the main control section 11 with an operation command, etc., by the user.

The touch panel section 53 includes a touch panel unit, etc., combined with a touch panel and a color liquid crystal display (LCD). The touch panel section 53 displays a variety of operation screens, for example, information on a document size, a copy size and the number of copies in performing the copy function and also displays an operation button in order that the user may input a variety of operation commands by touching a relevant place.

The operation key section 55 includes a plurality of operation keys to accept an operation input by the user. The operation key section 55 is used, for example, when the user selectively conducts a key input operation of a necessary function from among a variety of functions such as copy function, printer function, scanner function and facsimile function or when the user inputs the number of copies and a command to execute copying.

The facsimile communication section 61 includes an encoding/decoding section (not shown), a modulation and demodulation section (not shown) and a network control unit (NCU) (not shown). The facsimile communication section 61 transmits image data of a document which has been read by the scanner section 21, to a facsimile machine, etc., via a telephone line and receives image data which has been transmitted by a facsimile machine, etc.

The HDD (Hard Disk Drive) 63 stores image data which has been read by the scanner section 21 and a variety of data such as output format set in the image data. The image data stored in the HDD 63 is not only used inside an image forming apparatus, a program and a recording medium but also checked from a client PC, etc., via the network I/F section 65 or transferred to a predetermined folder on a client PC, a file transfer protocol (FTP) server, etc., if necessary.

The network I/F section 65 controls transmission and reception of a variety of data relative to a user terminal 67 such as a client PC, etc., connected via the LAN, with use of a network interface (10/100 Base-TX).

The IC card communication section 67 has a function of detecting access by a card key 69 such as an IC tag, etc., the user carries, reading out user identification information stored in the card key 69, and forwarding the information to the main control section 11.

In order to realize a test print function which is practical with a high level of user satisfaction, the main control section 11 includes a user authentication section 70 performing user authentication on whether an accessing user is a registered user every time of access, an operational information accepting section 71 accepting operational information about selection of an image quality mode in line with a user's intention from among a plurality of image quality modes provided in advance according to the type of document, operational information about selection of one or more image quality adjusting elements in line with a user's intention from among variations of all sorts of image quality adjusting elements such as sharpness, image density, etc., or operational information about selection of an image that assumes image quality in line with a user's intention from among variation images on an image quality adjusting band having been presented as test print images on a sheet of recording paper when a determination that the accessing user is a registered user is made as a result of the user authentication in the user authentication section 70, an image quality adjusting information storing section (corresponding to a part of a registration managing section in the present invention) 73 storing customized information about image quality adjustment as associating with each of a plurality of users, a test print image creating section 75 creating test print images in which variation images on an image quality adjusting band are laid out into a single page, based on the operational information about selection of the image quality mode and the operational information about selection of the various image quality adjusting elements, as focusing on one image quality mode having been selected from among the plurality of image quality modes, a reconstructing selection 76 reconstructing the image quality adjusting band as considering that the image quality in line with a user's intention be shifted to roughly the median on a relevant image quality adjusting band, based on the operational information in the operational information accepting section 71, and a registration managing section 77 combining the reconstructing function of the reconstructing selection 76 with a registration managing function, the registration managing function registering the image quality having been reconstructed based on the reconstructing function as customized information for the relevant user.

[Operation of the Image Forming Apparatus According to the Present Invention]

Figure 3:
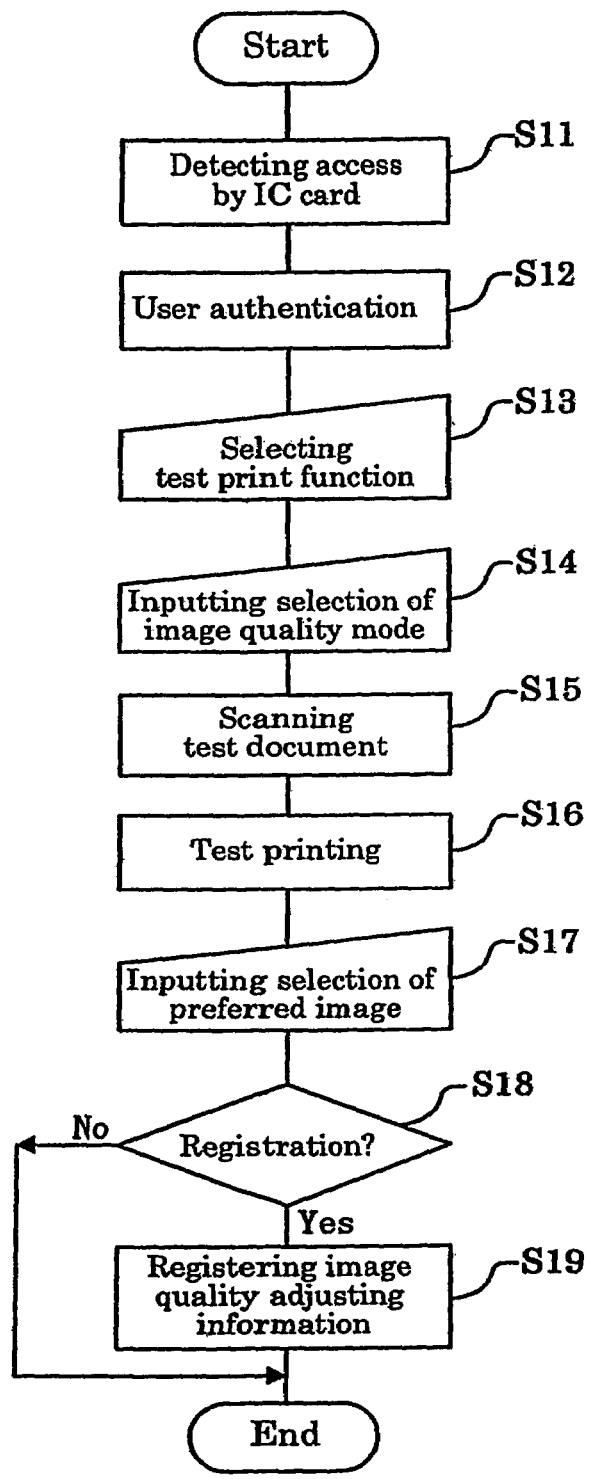
FIG. 3 is an operational flow chart of the image forming apparatus according to the present invention.

Next, operation of the image forming apparatus according to the present invention is described with reference to FIGS. 3 to 5.

Before an explanation of the operation is given, a configuration of the premised image forming apparatus will be mentioned. The image forming apparatus is provided with two authentication modes; one is a card key authentication mode of permitting a user to use the apparatus through data exchange of authentication information between the card key 69 carried by the user, and the other is a panel authentication mode of permitting a user to use the apparatus through requesting the user for a key input operation of user identification information and a password (authentication information). In principle, the apparatus operates in the card key authentication mode. In an embodiment below, operation of the apparatus in the card key authentication mode that is a processing following the principle is explained.

First, the IC card communication section 67 monitors access by the IC card key 69 at all times. When a user sets the IC card key 69 in a predetermined position in the image forming apparatus, the IC card communication section 67 detects access by the IC card key 69 (step S11). The IC card communication section 67 also reads out user identification information stored in the IC card key 69 and then forwards the read user identification information of the IC card key 69 to the main control section 11.

The main control section 11 compares the user identification information (referred to as user id) forwarded by the IC card communication section 67 with user identification information (referred to as user id) pre-registered in the registration managing section 77, thereupon performing user authentication on whether the accessing user via the card key authentication is a registered user (step S12). However, a log-in managing function by password may be added in the user authentication.

When a determination that the accessing user is a regular user is made, as a result of the user authentication in step S12, the operational information accepting section 71 accepts operational information about selection of the test print function by the user (step S13). Additionally, the operational information accepting section 71 accepts operational information about selection of an image quality mode in line with a user's intention from among a plurality of image quality modes provided in advance according to type of document, and also accepts operational information about selection of one or more image quality adjusting elements in line with a user's intention from among variations of all sorts of image quality adjusting elements such as sharpness, image density, etc. (step S14).

Subsequently, the scanner section 21 executes scanning of, for example, an A4 sized test document that is prepared in advance (step S15), thereby reading out an image from the document and outputting image data of the read image to the image processing section 31 and the test print image creating section 75 respectively. In addition, for the test document, a document prepared by an apparatus manufacturer may be used, and a document prepared by the user may be adopted as long as it has the same size as one designated by the apparatus manufacturer. When variation images with a plurality of image quality adjusting elements are laid out into a single page to be printed out, image reducing processing could constitute an obstacle to faithful image reproduction since its image reproduction manner is slightly different from that of an image at full scale. Thus, it is preferable not to perform image reducing processing at the time of N-up layout of the variation images. Therefore, it should be considered in determining a size of a test document such that all variation images can be laid out and printed out in a single page without image reducing processing.

Upon receiving the image data of the test document in step S15, the test print image creating section 75 creates test print images in which the variation images on the image quality adjusting band are laid out into a single page, based on the operational information about selection of the image quality mode and the operational information about selection of all sorts of image quality adjusting elements in step S14, as focusing on the selected image quality mode. Then, the test print image creating section 75 forwards the test print images to the engine section 41. In response to that, the engine section 41 image-forms the test print images having been created in the test print image creating section 75 on a sheet of recording paper (step S16). The print images in step S16 are created by sequentially executing image processings for each of the variation images on the image quality adjusting band.

After looking at the test print images formed on the sheet of recording paper, the user selects an image assuming image quality in line with his/her intention from among the variation images presented on the sheet. Then, the operational information accepting section 71 accepts operational information about the selection of the image (step S17). At this time, the reconstructing selection 76 reconstructs the image quality adjusting band as considering that the image quality in line with a user's intention be shifted to roughly the median on a relevant image quality adjusting band, based on the operational information in the operational information accepting section 71. More specifically, for example, suppose that a five-level adjusting margin in increments of (1) level such as levels (1), (2), (3), (4) and (5) is defined as an adjusting margin of the image quality adjusting band for sharpness adjustment. When the user selects the level (1) as a sharpness adjustment level in line with his/her intention, the registration managing section 77 reconstructs the image quality adjusting band as considering that the selected level (1) be shifted to roughly the median on the image quality adjusting band, more specifically, in such a manner that the adjusting margin of the image quality adjusting band for the sharpness adjustment is shifted to levels (−1), (0), (1), (2) and (3). At this time, the reconstructing selection 76 may adopt a configuration of reconstructing by enlarging the adjusting margin of the image quality adjusting band. More specifically, for example, suppose that a five-level adjusting margin in increments of (1) level such as levels (1), (2), (3), (4) and (5) is defined as an adjusting margin of the image quality adjusting band for sharpness adjustment. When the user selects the level (2) as a sharpness adjustment level in line with his/her intention, the reconstructing selection 76 reconstructs by enlarging the adjusting margin of the image quality adjusting band in increments of (0.5) level such as levels (1), (1.5), (2), (2.5) and (3) on the occasion of shifting the selected level (2) to roughly the median on the image quality adjusting band. The enlarging reconstruction can meet the demand of breaking up and fine-tuning an adjusting margin provided as its default for the purpose of obtaining preferred image quality. Instead of the foregoing reconstruction of the image quality adjusting band, the registration managing section 77 may adopt a configuration of converting details of the image quality adjustment having been selected by the user into a shift amount relative to a default setting value, and then presenting the shift amount to the user through displaying the shift amount on the touch panel section 53. If thus configured, the user can be informed which level on the image quality adjusting band provided in advance an image quality adjusting point in line with his/her intention is located.

Subsequently, the registration managing section 77 awaits a registration intention of image quality adjusting details by the logged in user. When an operation of the registration intention of image quality adjusting details by the logged in user is input, the registration managing section 77 registers image quality adjusting information about the image quality adjusting details in line with the logged in user's intention as customized information for the user of interest, based on the operational information about the image selection in the step S17 (step S19). As a mode of the registration, a mode of registering the customized information for the user of interest on a one touch key may be adopted. By this means, from the next log-in, the user who has already registered the image quality adjusting information about the image quality adjusting details as customized information can call his/her customized information via an automatic or explicit operation if needed, thereby making available for repetitive use. In addition, the image quality adjusting information may be configured to be reset to the default setting value when the logged in user logs out, when a specific key is input or when a given length of time elapses after the job is completed. Additionally, there may be adopted a configuration of providing an administrator setting mode separately and rejecting a change into a default mode or other user settings when the apparatus is in the administrator setting mode. More specifically, for example, there may be adopted a configuration of displaying a message such as "You are now in administrator mode. Enter an administrator code and then confirm your entry," awaiting the entry confirmation of the administrator code and permitting registration of the customized information when the apparatus is in the administrator mode.

A problem arises as to what kind of variation images should be conceived practically at the time of creating test print images in which variation images on the image quality adjusting band are laid out into a single page, as focusing on an image quality mode having been selected by the user.

As for this, variations of the image quality mode include a text mode, a text/photo mode containing both test and photographs, a photo mode, etc., as shown in FIG. 4, for example.

Image quality adjusting elements made to be combined as focusing on each image quality mode include, for example, a sharpness adjusting function for adjusting edge enhancement of an image in which appropriate adjusting levels, for example, three levels can be adopted, an image density adjusting function for adjusting image density in which appropriate adjusting levels, for example, five levels can be adopted, a ground color adjusting function for adjusting density matched to the ground color of a document in which appropriate adjusting levels, for example, two levels of ON and OFF can be adopted, etc.

The example of FIG. 4 illustrates that three of the sharpness adjusting function, image density adjusting function and ground color adjusting function among image quality adjusting elements are applicable in combination when the image quality mode is the text mode, and two of the sharpness adjusting function and image density adjusting function among image quality adjusting elements are applicable in combination when the image quality mode is the text/photo mode or photo mode.

Figure 5:
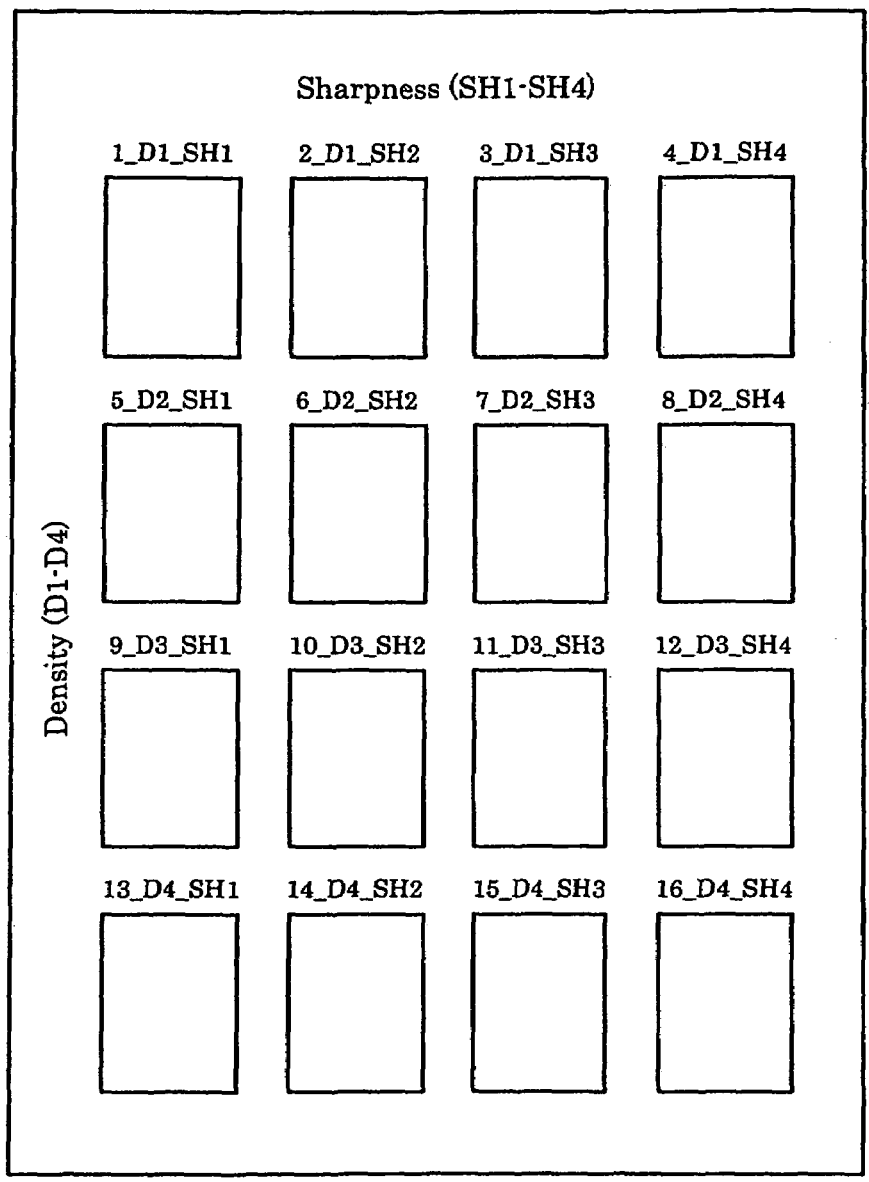
FIG. 5 is an explanatory diagram showing an example of test print images in which variation images of the image quality adjusting elements are laid out into a single page.

Herein, FIG. 5 illustrates an example of test print images when the user selects the text/photo mode as image quality mode and two of the sharpness adjusting function and image density adjusting function as image quality adjusting elements.

More specifically, in the example of FIG. 5, 16 different variation images with a combination of variations with four-level sharpness adjustment and variations with similarly four-level density adjustment as focusing on the text/photo mode having been selected by the user are illustrated as an example of test print images in which variation images are laid out into a single page. To each of the variation images, added is image identification information for uniquely identifying each variation image such as (1_D1_SH1), (2_D1_SH2), (3_D1_SH3), etc., as shown in FIG. 5, for example. Therefore, the user is to use the image identification information to input his/her selection of an image in line with his/her intention in step S17. More specifically, for example, when (7_D2_SH3) shown in FIG. 5 is the image in line with a user's intention, it can be configured such that relevant image identification information is input in double digits in a row such as (77). On the other hand, when an intermediate image between (7_D2_SH3) and (8_D2_SH4) shown in FIG. 5 is the image in line with a user's intention, it can be configured such that identification information of two images sandwiching the intermediate image are input in double digits in a row such as (78).

Meanwhile, preferred image quality varies greatly among users in general. Therefore, a difficulty in laying out all variation images related to image quality adjustment into a single page could arise when, for example, three image quality adjusting elements are selected for the purpose of obtaining preferred image quality.

From this point of view, the test print image creating section 75 can adopt a configuration of performing processing of intermittently thinning out variation images on the image quality adjusting band at the time of creating test print images in which the variation images are laid out into a single page. More specifically, for example, when five-level adjusting margin in increments of (1) level such as levels (1), (2), (3), (4) and (5) is defined as an adjusting margin of the image quality adjusting band for sharpness adjustment, level (2) and level (4) are evenly thinned out intermittently, thereby simplifying the adjusting margin of the image quality adjusting band into three levels of level (1), level (3) and level (5). If configured as above, even when variations in selection of image quality adjusting elements keep on widening, an overview of the test print images can be provided to the user by creating test print images in which all variation images on the image quality adjusting band are laid out into a single page. When the user has a look at the test print images having been thinned out to the three levels of (1), (3) and (5) from the original five levels as the adjusting margin of the image quality adjusting band for sharpness adjustment, for example, and then wants to select a sharpness adjustment level of level (2) which is intermediate between levels (1) and (3), the aforementioned technique of the enlarging reconstruction of the image quality adjusting band may be applied.

[Effects of the Embodiment]

According to the image forming apparatus of the embodiment of the present invention, as described above, the test print images are created as focusing on each of the plurality of image quality modes that are provided in advance according to the type of document and with high practical needs such as text mode, photo mode, text/photo mode containing both text and photographs, etc. The test print images thus created are image-formed on a sheet of recording paper and then offered for the intended purpose of image quality selection in accordance with the user's preference. Accordingly, an image forming apparatus capable of realizing a test print function that is practical with a high level of user satisfaction can be provided.

[Other]

The present invention should not be restricted to the aforementioned embodiment and can be modified as appropriate without departing from the spirit or technical idea of the present invention understood from the claims and the specification. Image forming apparatuses with such modifications are also to fall within the technical scope of the present invention.

More specifically, an image forming apparatus being operated in card key authentication mode is exemplarily described in the embodiment of the present invention. However, the present invention should not be limited to the embodiment and is applicable to, for example, an image forming apparatus being operated in panel authentication mode that permits the user to use the apparatus through requesting the user for a key input operation of user identification information and a password.

Lastly, there are a variety of modes obviously within the scope of identity in the present invention as described above. Such modes are not construed as departing from the intention and scope of the invention. Changes and modifications which are obvious to those skilled in the art fall within the technical scope of the claims in accordance with the present invention.

What is claimed is:

1. An image forming apparatus comprising:
an operational information accepting section accepting operational information, said operational information comprising first information indicative of a selection of one image quality mode in line with a user's intention from among a plurality of image quality modes provided in advance according to the type of document, and second information selecting one or more image quality adjusting elements in line with a user's intention from among variations of image quality adjusting elements, wherein said operational information accepting section sets said one image quality mode and said one or more image quality adjusting elements;
a test print image creating section determining respective ranges of image quality adjusting bands according to the set one image quality mode, wherein for values of image quality adjusting elements assigned to the set one image quality mode, each value is adjustable within the corresponding one of the ranges of the image quality adjusting band so that one value is selected from among a plurality of values that gradually increase in the corresponding one of the ranges of the image quality adjustment bands, and wherein the test print image creating section creates test print images in which variation images are prepared to have different image qualities for the set one image quality mode through image processing based on sets of the plurality of values for the respective ranges of the image quality adjustment bands of the image quality adjustment elements assigned to the set one image quality mode, and wherein the test print images are laid out into a single page; and
an image forming section forming the test print images having been created by the test print image creating section on a sheet of recording paper; and
wherein said operational information further comprises information for selecting an image that assumes image quality in line with a user's intention from among the variation images having been presented as the test print images on the sheet of recording paper;
wherein said operational information accepting section sets adjusted values of the selected one or more image quality adjusting elements according to said information for selecting said image of said operational information, thereby selecting respective values of the image quality adjusting elements assigned to the selected one image quality mode all at once; and
wherein the image forming apparatus further comprises a reconstructing section reconstructing the image quality adjusting band by shifting the corresponding one of the adjusted values on a substantial medium value of a plurality of values for the image quality adjusting band.

2. The image forming apparatus according to claim 1, wherein the reconstructing section enlarges and reconstructs the image quality adjusting band at the time of shifting the image quality in line with a user's intention to roughly the median on the image quality adjusting band.

3. The image forming apparatus according to claim 1, further comprising a registration managing section registering image quality adjusting information, said image quality adjusting information including image quality adjusting details in line with a user's intention as customized information for the user of interest, said image quality adjusting information being based on said information for selecting said image of said operational information.

4. The image forming apparatus according to claim 1, wherein the test print image creating section performs intermittent thinning processing to the variation images at the time of creating the test print images in which the variation images on the image quality adjusting band are laid out into a single page.

5. The image forming apparatus according to claim 4, wherein the variation images are thinned out at roughly regular intervals.

6. The image forming apparatus according to claim 1, further comprising an image quality adjusting information storing section that stores customized information about image quality adjustment as associated with each of a plurality of users.

7. The image forming apparatus according to claim 6, further comprising a one-touch key by which a user enters a mode for registering customized information of said user.

8. The image forming apparatus according to claim 1, wherein the image quality mode has a value indicative of one of a text mode, a photo mode, a text/photo mode including both text and a photo.

9. The image forming apparatus according to claim 1, wherein the image quality adjusting elements comprise an image density adjusting functional element, and a plurality of sharpness adjusting functional elements.

10. The image forming apparatus according to claim 1, wherein the test print images laid out into the single page are arranged as a matrix.

* * * * *